United States Patent
Lennox, III

(10) Patent No.: US 7,578,732 B2
(45) Date of Patent: Aug. 25, 2009

(54) SEMI-CONTINUOUS MEAT PRESS METHOD AND APPARATUS

(75) Inventor: John Malcolm Lennox, III, Sebastopol, CA (US)

(73) Assignee: Maritek, LLC, Santa Rosa, CA (US)

( * ) Notice: Subject to any disclaimer, the term of this patent is extended or adjusted under 35 U.S.C. 154(b) by 0 days.

(21) Appl. No.: 11/814,538

(22) PCT Filed: Jan. 23, 2006

(86) PCT No.: PCT/US2006/002272
§ 371 (c)(1),
(2), (4) Date: Jul. 23, 2007

(87) PCT Pub. No.: WO2006/079022
PCT Pub. Date: Jul. 27, 2006

(65) Prior Publication Data
US 2008/0160893 A1    Jul. 3, 2008

(51) Int. Cl.
*A22C 9/00* (2006.01)
(52) U.S. Cl. .................................................. 452/141
(58) Field of Classification Search ............... None
See application file for complete search history.

(56) References Cited

U.S. PATENT DOCUMENTS

| 4,417,368 | A  | * | 11/1983 | Washburn ..................... 452/34 |
| 4,467,497 | A  | * | 8/1984 | Peterson et al. ............. 452/174 |
| 4,649,600 | A  | * | 3/1987 | Langen et al. .............. 452/138 |
| 5,947,810 | A  | * | 9/1999 | Magnasco et al. ........... 452/138 |
| 6,482,079 | B1 | * | 11/2002 | Nakamura et al. ............ 452/47 |
| 6,601,499 | B1 | * | 8/2003 | Bifulco ........................ 100/73 |
| 2002/0012726 | A1 | | 1/2002 | Anders et al. |

* cited by examiner

*Primary Examiner*—Thomas Price
(74) *Attorney, Agent, or Firm*—Craig M. Stainbrook; Stainbrook & Stainbrook, LLP

(57) ABSTRACT

A semi-continuous meat press includes a frame supporting an upper press pad and a lower press pad, positioned adjacent one another to define an open position and a closed position, the closed position having a selectable, adjustable gap between the pads. Upper and lower flexible belts are interposed between the upper and lower press pads, and serve to convey meat pieces between the press pads for the pressing step. The upper and lower press pads and upper and lower flexible belts are urged together by hydraulic cylinders through a four bar mechanical linkage. The press pads are made of a soft pliable plastic material to allow the meat pieces to sink into the pads and provide space for the pliable plastic material to move around and envelop the thick parts of the meat pieces.

10 Claims, 1 Drawing Sheet

SEMI-CONTINUOUS MEAT PRESS METHOD AND APPARATUS

BACKGROUND OF THE INVENTION

1. Technical Field

The present invention relates generally to food processing and associated equipment, and more particularly to an improved method and apparatus for the semi-continuous pressing of meat pieces.

2. Background Art

The flattening of meat products in the food processing industry is well known. For many years machines called 'flatteners' have been used in the meat industry to crush meat pieces to change the shape of the pieces for processing. Meat that is crushed to a reasonably even thickness cooks more evenly than does the same piece in a natural shape which may have thick sections and thin sections. In the case of standard flatteners the only objective is to create a piece of meat with a standard thickness. This process damages the meat fibers in the thick sections of the meat piece, and does nothing to the fibers in the thin sections. If a meat piece is crushed in a standard flattener and is marinated in a tumbler drum it typically splits or breaks apart into several smaller pieces.

This conventional type of flattener will not work at all when the meat pieces have bones in them. The bones do not allow the meat piece to be flattened, and when flattening is attempted in a conventional flattener the meat is stripped away from the bones and the bones are broken, resulting in unacceptable damage to the product.

It has been discovered that if meat pieces are pressed with a significant amount of force applied more or less evenly throughout the piece of meat, it will tenderize the meat piece and condition the meat fibers so that marinade will be absorbed into the meat fibers without the use of a vacuum. This pressing must be done in a manner where nearly the same force is applied to all parts of the meat piece, regardless of the shape of the meat and regardless of whether there is a bone in the meat. This type of pressing of the meat is not possible with a conventional flattener because the contact parts of the conventional flatteners are hard and inflexible.

To make an effective conditioning press a number of methods of pressing have been proposed. Running the meat pieces between two pliable rollers is one method that was tried. The problem with this method of pressing is that the thick parts of the meat or the bone would hang up at the entry point of the rollers and would not be pulled in between the rollers. Since part of the piece was in between the rollers but the thick parts of the pieces would not pull in, the rotating rollers would pull the meat pieces apart, causing significant damage to the pieces of meat.

Another method that was tried was to press the meat with a roller or flat pad that was actuated by air pressure. The theory of this concept was to control the force applied to the meat with air cylinders to reduce the damage to the meat. The problem with this system of actuating the press with air cylinders is threefold. First, the contact surfaces must be pliable in order to apply the same force onto all sections of the meat piece regardless of the thickness of each section, even if there are bones in the meat. Next, the pressure must be high enough to properly condition the meat fibers throughout all sections of the meat piece. Finally, the proper pressing pressure must be applied regardless of the number of meat pieces in the press at one time. This last requirement made air cylinder actuation unacceptable. Since the air in the cylinders is compressible, the force actually applied to each meat piece is inversely proportional to the number of pieces in the press at one time.

All types of methods of pressing with the press pads in direct contact with the meat pieces caused excessive damage to the meat. The friction between the press pads and the meat piece as the meat piece was deformed under pressure caused excessive damage to the surface of the meat piece. This damage was intermittent in that one piece would be undamaged while the piece beside it would be excessively damaged. Presumably the difference in damage was related to the difference in structural makeup of the pieces of meat.

United States Patent Application 20020012726 by Anders, et al. discloses a liquid infusion and tenderization process, apparatus, and product for treating food items having muscle protein. The inventive method continuously presses the food items in a pressing chamber having a plunger and trough arrangement, using a pliable material which conforms to and at least partially surrounds the food items when pressing, and/or infuses the food items with a treatment liquid preferably by impacting the food items while they are at least partially suspended in the solution.

In summary, conventional methods of pressing meat pieces are unacceptable in terms of muscle damage and/or inflexible or noncompliant force being applied to all sections of the meat piece.

The foregoing discussion reflects the current state of the art of which the present inventor is aware. Reference to, and discussion of, this information is intended to aid in discharging Applicant's acknowledged duty of candor in disclosing information that may be relevant to the examination of claims to the present invention. However, it is respectfully submitted that none of the prior art discloses, teaches, suggests, shows, or otherwise renders obvious, either singly or when considered in combination, the invention described and claimed herein.

DISCLOSURE OF INVENTION

The semi-continuous meat press method and apparatus of the present invention provides a machine for pressing meat products to condition the meat before marination. The invention involves positioning the meat pieces (either or both bone-in and boneless) between two flexible plastic belts and pressing the two belts against the meat pieces with two pliable pads so that the meat pieces are pressed into the flexible belts and pads and the pads envelop the meat pieces, exerting nearly the same pressure in all directions around the meat and bone. The bones in bone-in pieces sink into the pliable pads in such a way that the meat around the bones is exposed to nearly the same pressure as the meat would be if there were no bones. The flexible belts reduce damage to the meat pieces by providing a low-friction protective layer around the meat pieces to contain the meat as it is flattened.

It is therefore an object of the present invention to provide a new and improved semi-continuous meat press apparatus.

It is another object of the present invention to provide a new and improved semi-continuous meat press that provides nearly the same pressure to all parts of the meat pieces.

A further object or feature of the present invention is a new and improved a meat press that does not damage the meat pieces being processed.

An even further object of the present invention is to provide a novel method for processing meat pieces.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the national and regional patent offices and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawing wherein.

BEST MODE FOR CARRYING OUT THE INVENTION

Figure 1:
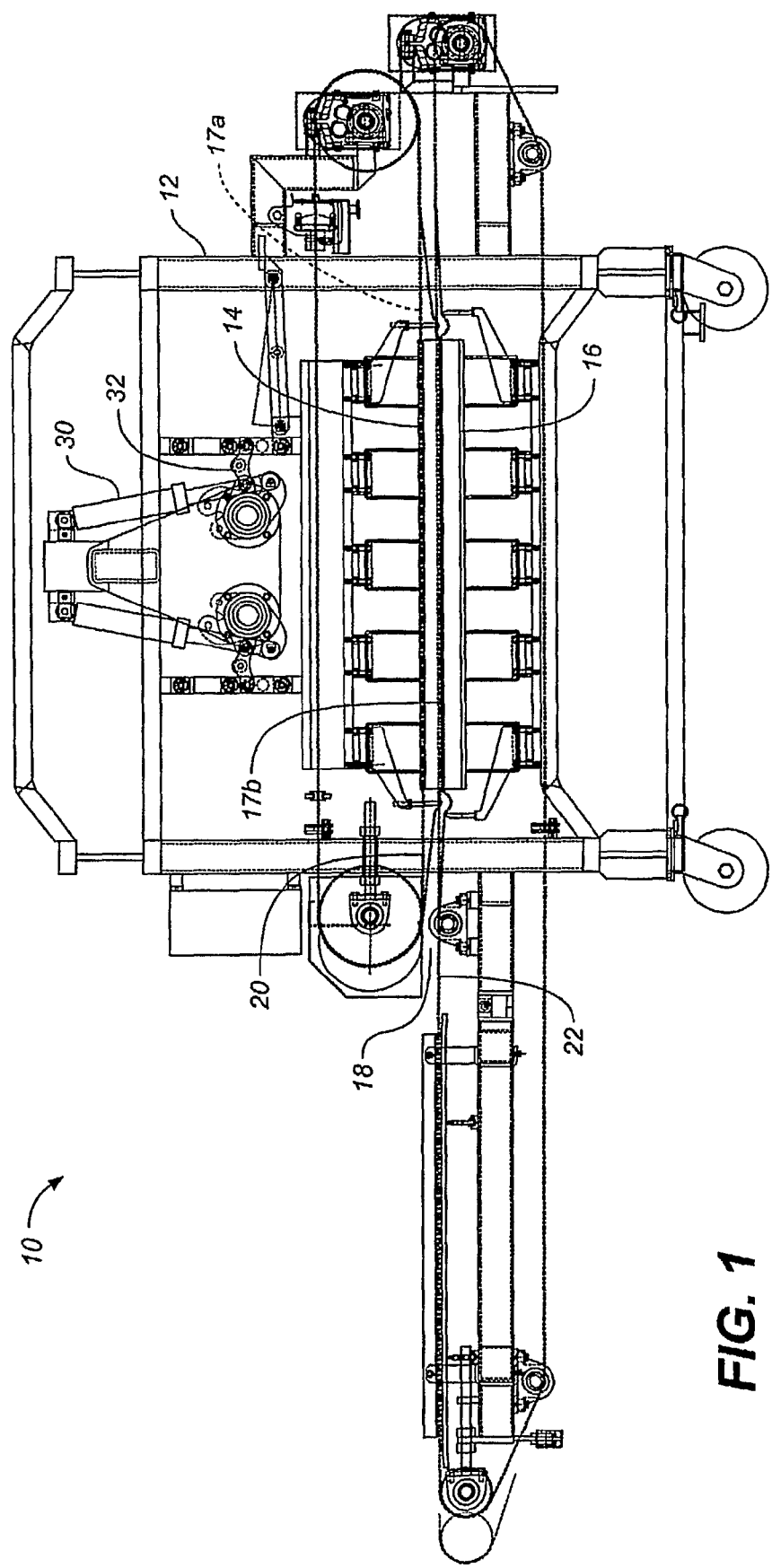
FIG. 1 is a side elevation view of a semi-continuous meat press apparatus of this invention.

Referring to FIG. 1, there is illustrated therein a new and improved semi-continuous meat press apparatus, generally denominated 10 herein. FIG. 1 illustrates a first preferred embodiment of the semi-continuous meat press apparatus 10, comprising a frame 12 supporting an upper press pad 14 and a lower press pad 16, positioned adjacent one another to define an open position 17a and a closed position 17b, the closed position having a selectable, adjustable gap 18 between the pads. Upper flexible belt 20 and lower flexible belt 22 are interposed between the upper and lower press pads, and serve to convey meat pieces between the press pads for the pressing step. The upper and lower press pads 14, 16 (and upper and lower flexible belts 20, 22) are urged together by hydraulic cylinders 30 through four bar mechanical linkage 32, which may include coordinating gears. Alternatively, other hydraulic, mechanical, or other motive means may be employed to achieve the requisite compression of the press pads and flexible belts, as is well known in the art.

The press pads 14, 16 are preferably flat pads which are thick and made of a soft pliable plastic material. The thickness is determined by how much flexibility is required to allow the meat pieces (bone-in or boneless) to sink into the pads and provide space for the pliable plastic material to move around and envelop the thick parts of the meat pieces. The thickness of the press pads 14, 16 will typically be in the range of from about one-half to three inches or more and will preferably be two to three times greater than the thickness of the meat pieces. Examples of suitable pliable materials include, but are not limited to: silicone, polyurethane, polyethylene, neoprene, or any industry available synthetic rubber. As will be understood by those skilled in the art, the pliable material is preferably a polymer such as polyurethane, which is compliant, homogenous, and cleanable.

After the meat pieces have been conveyed by the flexible belt(s) to a position between the press pads 14, 16, the two pads are preferably brought together to the closed position 17b with four bar mechanical linkage 32 actuated by hydraulic cylinders 30. The design of the four bar linkage is such that the maximum force applied to the meat pieces is applied when the four bar linkage nears its fully extended position which is when the pads are closest together. This is also the point in the closing of the pads where the force on the meat needs to be maximized.

The force that the pliable press pads apply to the meat needs to be different for different types of meat pieces. Fish, for example, requires much less pressing force than does beef which has more dense muscle fibers. However, since the force that is applied to each piece must vary depending on the deflection of the pliable pad and the number of pieces under the press at any one time, the mechanical actuation system must be able to apply the maximum pressure required for the most difficult application (dense meat pieces with the maximum number of pieces being pressed at one time).

In order to deal with different types of meat (fish, pork, beef, chicken) the press pads 14, 16 of this press system are preferably removable and replaceable with different pads. For the fragile types of meat (fish for example) the press pad material needs to be very soft and pliable. For the dense types of meat (beef for example) the press pads need to be very hard with a high durometer. It is the press pad durometer and the amount of pad deflection that determines the amount of force applied to each piece of meat. The durometer rating of the pads will preferably be in the range of from about 20 to about 80, depending on the type of meat. For poultry and pork, for example, a durometer rating of from about 20 to about 50 will preferably be used. For beef processing, the durometer rating of the may be in the range of from about 40 to about 80. A durometer rating of from about 20 to about 30 may be used when processing fish.

The mechanical actuation system applies the maximum force while the durometer, deflection and thickness of the press pads determine how much of this press force is applied to each piece of meat that is in the press at one time. With this system it does not matter how loaded the press is—there will always be nearly the same force applied to each meat piece, regardless of the thickness of the pieces.

To avoid damaging the thin section of the meat pieces around the edge of the pieces, it is necessary to very precisely adjust the gap 18 of closed position 17b between the two press pads. For example, on fish products the gap between the pads when they are fully extended may be as much as 3/16 inch to avoid damaging the thin edges. For this reason the press design should accommodate precise adjustments of the gap between the pads at full pad extension. This adjustment may be variable between, e.g., minus 1/8 inch (the two press pads are urged together beyond the point where they initially contact by 1/8 inch) and plus 3/4 inch (the two press pads are 3/4 inch apart when the press pads are fully extended).

In addition to that stated above, to avoid damaging the thin section of the meat pieces around the edge, the pads 14, 16 can be designed with varying layers of plastic with different durometers or pliability. For example, for reasonably fragile meat pieces such as chicken breast meat, the surface layer of the press pad may be quite soft to avoid damaging the breast pieces, while the inner layers may be less pliable to exert the proper force on the meat pieces to get the desired conditioning effect.

All the points stated above will still not completely solve the problem of damage to fragile meat pieces because the press pads create friction with the outer surface of the meat pieces when the meat pieces expand as they are pressed. To overcome this problem the thin flexible belting 20, 22 is placed above and below the pieces of meat between the press pads 14, 16. This thin flexible belting material is preferably constructed of low friction material and readily flexes to conform to the shape of the meat piece. The flexible belting acts as a low friction 'wrapper' around each piece of meat protecting it from damage as the meat expands. This addition to the system is critical to minimizing product damage. The thin flexible belting also acts as a conveyor belt to convey the meat pieces into the press between the two press pads.

Accordingly, the present invention provides an improved meat press apparatus having some or all of the following features:

The press system conditions meat pieces by pressing two pliable pads together to prepare the meat for marination.

The press system preferably utilizes a mechanical four bar linkage which maximizes the pressing force when the press pads are at their closest juxtaposition.

The press pads are made of thick pliable plastic that envelops the meat pieces applying nearly the same force to all parts of the piece of meat regardless of the thickness of the meat pieces, and regardless of the number of meat pieces in the press at one time.

The press pads can be made of layers of different durometer material.

The gap between the press pads at full extension is adjustable.

The press pads are separated from the meat pieces by a thin flexible belt material that acts as a wrapper protecting the meat pieces from damage.

The inventive apparatus may be characterized as a semi-continuous meat press apparatus comprising a frame; an upper press pad and lower press pad supported on the frame and positioned adjacent one another to selectively define an open position and a closed position between them; an upper flexible belt and lower flexible belt interposed between the upper and lower press pads; and means for urging the upper press pad and lower press pad to the closed position, wherein the upper press pad and lower press pad are formed of a pliable material and will conform to and at least partially surround food items as the food items are pressed between the upper press pad and lower press pad.

The inventive method may be characterized as a method for the semi-continuous pressing of meat pieces comprising the steps of: providing a semi-continuous meat press apparatus having a frame, an upper press pad and lower press pad supported on the frame and positioned adjacent one another to selectively define an open position and a closed position between them, and an upper flexible belt and lower flexible belt interposed between the upper and lower press pads; conveying a quantity of meat pieces between the upper and lower flexible belts; urging the upper press pad and lower press pad to the closed position; and conforming the upper press pad, upper flexible belt, lower press pad, and lower flexible belt to the meat pieces as the meat pieces are pressed between the upper press pad and lower press pad.

The foregoing disclosure is sufficient to enable one having skill in the art to practice the invention without undue experimentation, and provides the best mode of practicing the invention presently contemplated by the inventor. While there is provided herein a full and complete disclosure of the preferred embodiments of this invention, it is not intended to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A semi-continuous meat press apparatus comprising:
a frame;
an upper press pad and lower press pad supported on said frame and positioned adjacent one another to selectively define an open position and a closed position between them;
an upper flexible belt and lower flexible belt interposed between said upper and lower press pads;
means for urging said upper press pad and lower press pad to said closed position, wherein said upper press pad and lower press pad are formed of a pliable material and will conform to and at least partially surround food items as said food items are pressed between said upper press pad and lower press pad.

2. The semi-continuous meat press apparatus of claim 1 wherein said closed position has a selectable, adjustable gap.

3. The semi-continuous meat press apparatus of claim 1 wherein said means for urging said upper press pad and lower press pad to said closed position comprises hydraulic cylinders.

4. The semi-continuous meat press apparatus of claim 1 wherein said means for urging said upper press pad and lower press pad to said closed position comprises a four bar mechanical linkage.

5. The semi-continuous meat press apparatus of claim 1 wherein at least one of said upper flexible belt and lower flexible belt convey food pieces between said upper and lower press pads.

6. The semi-continuous meat press apparatus of claim 1 wherein said upper and lower press pads are flat pads made of a soft pliable plastic material.

7. The semi-continuous meat press apparatus of claim 1 wherein said means for urging said upper press pad and lower press pad to said closed position applies maximum force as said upper press pad and lower press pad approach said closed position.

8. The semi-continuous meat press apparatus of claim 1 wherein said means for urging said upper press pad and lower press pad to said closed position is adjustable in force.

9. The semi-continuous meat press apparatus of claim 1 wherein said an upper flexible belt and lower flexible belt are constructed of low friction material to minimize damage to food items placed therebetween.

10. The semi-continuous meat press apparatus of claim 1 wherein said upper press pad and lower press pad apply the same force to all pans of food items placed therebetween.

* * * * *